United States Patent
Horii

(10) Patent No.: US 9,731,713 B2
(45) Date of Patent: Aug. 15, 2017

(54) MODIFYING AUTONOMOUS VEHICLE DRIVING BY RECOGNIZING VEHICLE CHARACTERISTICS

(71) Applicant: VOLKSWAGEN AG, Wolfsburg (DE)

(72) Inventor: Hiroshi Horii, Redwood City, CA (US)

(73) Assignee: VOLKSWAGEN AG (DE)

( * ) Notice: Subject to any disclaimer, the term of this patent is extended or adjusted under 35 U.S.C. 154(b) by 0 days.

(21) Appl. No.: 14/482,800

(22) Filed: Sep. 10, 2014

(65) Prior Publication Data

US 2016/0068156 A1    Mar. 10, 2016

(51) Int. Cl.
*B60W 30/00* (2006.01)
*B60W 30/095* (2012.01)
*B60W 30/18* (2012.01)
*B60W 40/04* (2006.01)

(52) U.S. Cl.
CPC ........ *B60W 30/00* (2013.01); *B60W 30/0956* (2013.01); *B60W 30/18163* (2013.01); *B60W 40/04* (2013.01)

(58) Field of Classification Search
CPC .......................... B60W 30/00; B60W 30/0956
See application file for complete search history.

(56) References Cited

U.S. PATENT DOCUMENTS

| 8,457,827 | B1* | 6/2013 | Ferguson | G05D 1/00 180/169 |
| 8,731,742 | B2* | 5/2014 | Zagorski | G08G 1/166 701/3 |
| 8,849,557 | B1* | 9/2014 | Levandowski | G08G 1/01 701/300 |
| 2004/0107030 | A1* | 6/2004 | Nishira | B60W 40/02 701/36 |
| 2008/0294315 | A1* | 11/2008 | Breed | B60N 2/002 701/49 |
| 2009/0118896 | A1* | 5/2009 | Gustafsson | G05D 1/104 701/31.4 |
| 2012/0083960 | A1* | 4/2012 | Zhu | G05D 1/0055 701/23 |

(Continued)

FOREIGN PATENT DOCUMENTS

| DE | 102011002275 A1 | 10/2012 |
| DE | 102011112812 A1 | 3/2013 |

(Continued)

OTHER PUBLICATIONS

European Search Report for Patent Application No. 15178221.6-1752, dated Feb. 12, 2016.

*Primary Examiner* — Truc M Do
*Assistant Examiner* — Jess Whittington
(74) *Attorney, Agent, or Firm* — Barnes & Thornburg LLP

(57) ABSTRACT

A system for controlling an autonomous vehicle having cameras for obtaining image data of neighboring vehicles in a proximity of the autonomous vehicle and for identifying physical characteristics of the neighboring vehicles, including makes, models, and trims of neighboring vehicles, colors of the neighboring vehicles, and exposed cargo being carried by the neighboring vehicles. The system maps the identified physical characteristics into predicted potential on-road events in the proximity of the autonomous vehicle, and makes driving decisions based on the predicted potential on-road event.

18 Claims, 8 Drawing Sheets

(56) References Cited

U.S. PATENT DOCUMENTS

| | | | |
|---|---|---|---|
| 2012/0119894 A1* | 5/2012 | Pandy | B60W 30/16 340/435 |
| 2013/0218427 A1* | 8/2013 | Mukhopadhyay | B60W 40/09 701/51 |
| 2014/0037142 A1* | 2/2014 | Bhanu | G08G 1/015 382/103 |
| 2014/0085475 A1* | 3/2014 | Bhanu | G06K 9/00825 348/148 |
| 2014/0236414 A1* | 8/2014 | Droz | B60W 30/00 701/28 |
| 2014/0236472 A1* | 8/2014 | Rosario | G01C 21/3602 701/400 |
| 2014/0278052 A1* | 9/2014 | Slavin | G01C 21/3492 701/400 |
| 2015/0066349 A1* | 3/2015 | Chan | G01C 21/3407 701/400 |
| 2015/0103159 A1* | 4/2015 | Shashua | G06K 9/00798 348/118 |
| 2015/0211868 A1* | 7/2015 | Matsushita | G01C 21/32 701/457 |
| 2015/0294174 A1* | 10/2015 | Karkowski | G06K 9/325 382/182 |

FOREIGN PATENT DOCUMENTS

| | | |
|---|---|---|
| DE | 102013020435 A1 | 6/2014 |
| WO | 2012125687 A2 | 9/2012 |

\* cited by examiner

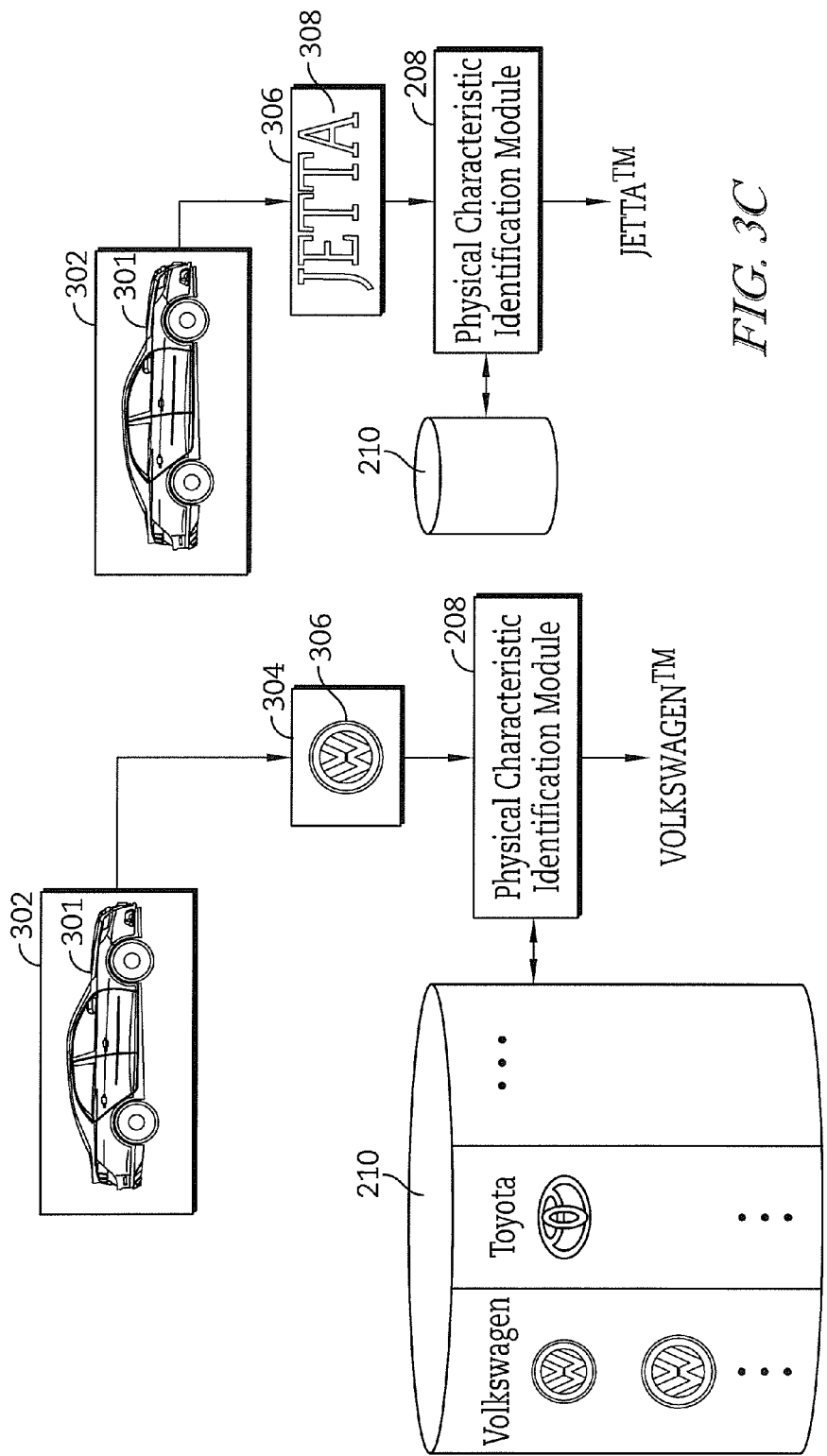

MODIFYING AUTONOMOUS VEHICLE DRIVING BY RECOGNIZING VEHICLE CHARACTERISTICS

BACKGROUND

The present disclosure relates to systems, components, and methodologies for automatically driving an autonomous vehicle. In particular, the present disclosure is directed to systems, components, and methodologies that improve driving decisions of autonomous driving systems.

SUMMARY

According to the present disclosure, systems, components, and methodologies are provided for automatically driving an autonomous vehicle.

In illustrative embodiments, an autonomous driving system identifies physical characteristics of neighboring vehicles, such as their respective makes, models, and trims. For each neighboring vehicle, the autonomous driving system may access information regarding typical driving patterns for vehicles of that type, predicts on-road events based on the typical driving patterns, and makes driving decisions based on the predicted on-road events. This may improve the safety and efficiency with which the autonomous driving system drives the autonomous vehicle.

Additional features of the present disclosure will become apparent to those skilled in the art upon consideration of illustrative embodiments exemplifying the best mode of carrying out the disclosure as presently perceived.

BRIEF DESCRIPTION OF THE FIGURES

The detailed description particularly refers to the accompanying figures in which:

FIGS. 3A-3C show exemplary modes of operation by which a physical characteristic identification module may identify physical characteristics of a vehicle, including vehicle class, vehicle make, and vehicle model;

DETAILED DESCRIPTION

Figure 1:
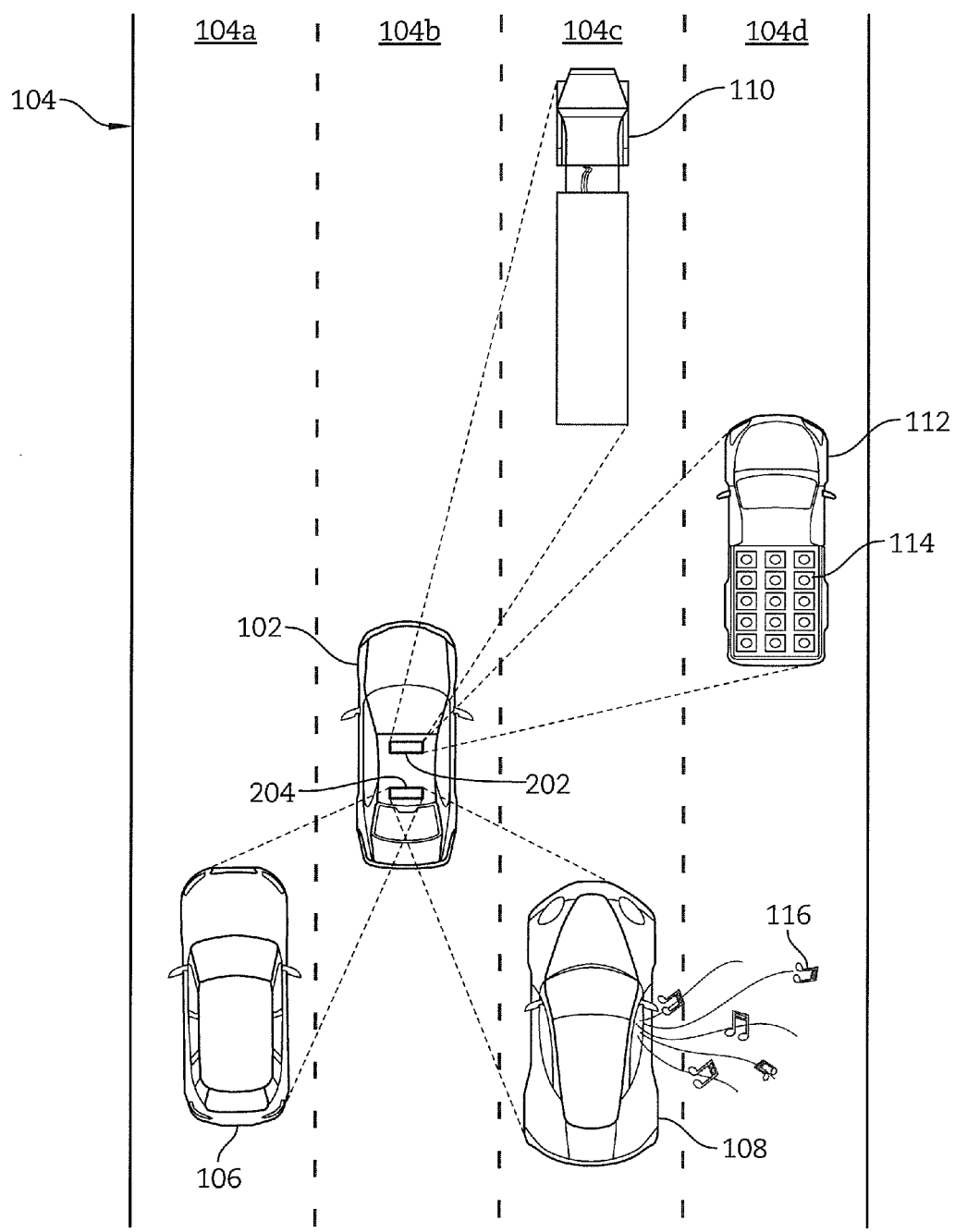
FIG. 1 shows an autonomous vehicle having an autonomous driving system in accordance with the present disclosure, and shows that the autonomous driving system includes cameras that collect image data that can be used to discern neighboring vehicles of varying types.

The figures and descriptions provided herein may have been simplified to illustrate aspects that are relevant for a clear understanding of the herein described devices, systems, and methods, while eliminating, for the purpose of clarity, other aspects that may be found in typical devices, systems, and methods. Those of ordinary skill may recognize that other elements and/or operations may be desirable and/or necessary to implement the devices, systems, and methods described herein. Because such elements and operations are well known in the art, and because they do not facilitate a better understanding of the present disclosure, a discussion of such elements and operations may not be provided herein. However, the present disclosure is deemed to inherently include all such elements, variations, and modifications to the described aspects that would be known to those of ordinary skill in the art.

Disclosed embodiments provide solutions to technical problems of autonomous driving systems by identifying physical characteristics of neighboring vehicles, such as their respective makes, models, and trims. For each neighboring vehicle, the autonomous driving system may access information regarding typical driving patterns for vehicles of that type, predicts on-road events based on the typical driving patterns, and make driving decisions based on the predicted on-road events. This may improve the safety and efficiency with which the autonomous driving system drives the autonomous vehicle. Thus, in illustrative embodiments, the autonomous driving system may do more than merely recognize and respond to location, speed, acceleration, and directional heading of neighboring vehicles. Rather, the autonomous driving system may additionally distinguish among neighboring vehicles based on physical characteristics on a vehicle-by-vehicle basis. The autonomous driving system may use these physical characteristics to identify driving patterns typical of each of the neighboring vehicles. This may allow the autonomous driving system to form more refined and accurate predictions of on-road events, and to make driving decisions that provide improved safety and efficiency.

For example, in illustrative embodiments, the autonomous driving system may recognize a vehicle driving in front of the autonomous vehicle as a sports car of a particular make, model, and trim. The autonomous driving system may access information indicating that vehicles of that particular make, model, and trim typically drive aggressively, with sudden accelerations and decelerations. The autonomous driving system may then predict that the sports car has a likelihood of suddenly decelerating. In response, the autonomous driving system may adopt a defensive driving profile and decide to slow down, increasing the following distance between the autonomous vehicle and the sports car and reducing the likelihood of an accident. As another example, the autonomous driving system may recognize a vehicle driving in front of the autonomous vehicle as a semi-truck and access information indicating that semi-trucks typically drive slowly with low levels of acceleration. The autonomous driving system may predict that the present lane is likely to move slowly, and execute a lane change to reduce travel time.

In illustrative embodiments, the autonomous driving system may make driving decisions based on other physical characteristics. For example, the autonomous driving system may recognize colors of neighboring vehicles (e.g., red, beige, etc.), which may impact its assessment of typical driving patterns. In still other examples, the autonomous driving system may recognize safety hazards visible on the neighboring vehicles, such as exposed cargo having the potential to come loose, and make driving decisions that avoid the safety hazards.

By way of example, the autonomous driving system may identify a pickup truck with loose gardening equipment exposed in its trunk. The autonomous driving system may predict that some of the equipment may come lose and fall onto the road, and in response elect to change lanes. In deciding how to change lanes, the autonomous driving system may identify a red car neighboring the autonomous vehicle to the left and a beige car neighboring the autonomous vehicle to the right. The autonomous driving system may predict that the red car is likely to drive faster than the beige car based on typical driving patterns of red and beige cars. In response, the autonomous driving system may elect to change into the right lane as the safer alternative.

An overview of methodologies in accordance with the present disclosure will be presented in connection with FIG. 1. In particular, FIG. 1 shows an autonomous vehicle 102 driving on a roadway 104 having four lanes 104a, 104b, 104c, and 104d. Several neighboring vehicles 106, 108, 110, and 112 are driving in proximity of the autonomous vehicle.

The autonomous vehicle 102 includes an autonomous driving system 200 (depicted in FIG. 2 and to be described in more detail below). The autonomous driving system 200 includes a front camera 202 and a rear camera 204 that capture image data of the proximity of the autonomous vehicle 102. Thus, for example, the front camera 202 may capture image data of the neighboring vehicles 110 and 112, both of which are located generally forward of the vehicle 102. Similarly, the rear camera 204 may capture image data of the neighboring vehicles 106 and 108, both of which are located generally rearward of the vehicle 102.

The autonomous driving system 200 uses image data of the neighboring vehicles 106, 108, 110, and 112 to identify physical characteristics of the neighboring vehicles 106, 108, 110, and 112. Physical characteristics may include, for example, vehicle class, make, model, and/or trim. Physical characteristics may also include vehicle color, sound emanating from a vehicle, odor emitted by a vehicle, or cargo carried by a vehicle. Other examples of physical characteristics within the scope of the present disclosure include whether the vehicle has tinted windows and wheel size of the vehicle. More generally, physical characteristics may include any observable trait that can be used to distinguish neighboring vehicles on a roadway.

For example, the autonomous driving system 200 may identify the vehicle class of the neighboring vehicles 106, 108, 110, and 112 as a physical characteristic—i.e., that the neighboring vehicle 106 is of the sedan class, that the neighboring vehicle 108 is of the sports car class, that the neighboring vehicle 110 is of the semi-truck class, and that the neighboring vehicle 112 is of the pick-up truck class. By way of additional examples, the autonomous driving system 200 may identify the vehicle make, model, and/or trim of the neighboring vehicles 106, 108, 110, and 112 as physical characteristics. Thus, with respect to make, the autonomous driving system 200 may recognize the neighboring vehicle 106 as a VOLKSWAGEN™, the neighboring vehicle 108 as a FERRARRI™, and the neighboring vehicle 112 as a TOYOTA™. With respect to model, the autonomous driving system 200 may recognize the neighboring vehicle 106 as a JETTA™, the neighboring vehicle 108 as a TESTAROSSA™, and the neighboring vehicle 112 as a TUNDRA™. With respect to trim, the autonomous driving system 200 may recognize the neighboring vehicle 106 as an SEL and the neighboring vehicle 112 as an SRS.

The autonomous driving system 200 may identify still other physical characteristics of the neighboring vehicles 106, 108, 110, and 112. For example, the autonomous driving system 200 may identify respective colors of the neighboring vehicles 106, 108, 110, and 112 (e.g., red, beige, silver, etc.). The autonomous driving system 200 may also identify safety hazards on the neighboring vehicles 106, 108, 110, and 112, such as loose, exposed cargo 114 on the neighboring vehicle 112. Moreover, the autonomous driving system 200 may recognize sounds or odors emitted by neighboring vehicles 106, 108, 110, and 112, such as loud music 116 emanating from the neighboring vehicle 108.

Continuing with the overview, the autonomous driving system 200 retrieves information regarding typical driving patterns for vehicles having the identified physical characteristics. Thus, in certain examples, the autonomous driving system 200 may retrieve typical driving patterns for identified vehicle classes—e.g., typical driving patterns as between sedans, sports cars, semi-trucks, SUVs, and pick-up trucks. In other examples, the autonomous driving system 200 may retrieve typical driving patterns for vehicle makes—e.g., typical driving patterns for VOLKSWAGENs™, FERRARRIs™, and TOYOTAs™. In still other examples, the autonomous driving system 200 may retrieve typical driving patterns for vehicle models, vehicle trims, or vehicle colors.

The autonomous driving system 200 predicts on-road events by applying the typical driving patterns to present conditions on the roadway 104. Thus, for example, the autonomous driving system 200 may ascertain that a typical driving pattern of the neighboring vehicle 108, which may be a red, FERRARRI™ TESTAROSSA™ sports car, is frequent lane changes and rapid acceleration and deceleration. The autonomous driving system 200 applies this typical driving pattern to the present conditions on the roadway 104 to predict that the neighboring vehicle 108 may rapidly accelerate in front of the autonomous vehicle 102 and change from lane 104c to lane 104b, driving between the autonomous vehicle 102 and the neighboring vehicle 110.

The autonomous driving system 200 then makes driving decisions based on the predicted on-road events. For example, the autonomous driving system 200 may slow the autonomous vehicle 102 as to increase the gap between the autonomous vehicle 102 and the neighboring vehicle 110. This will provide more room to allow the sports car 108 to navigate safely between the autonomous vehicle 102 and the neighboring vehicle 110, should that predicted on-road event transpire. As another example, the autonomous driving system 200 may execute a lane change from lane 104b to lane 104a as to provide a safer distance between the autonomous vehicle 102 and the loose, exposed cargo 114 on the neighboring vehicle 112.

Thus, the autonomous driving system 200 makes and executes driving decisions by identifying physical characteristics of vehicles, ascertaining typical driving patterns of vehicles having those physical characteristics, and predicting on-road events. By using physical characteristics of the neighboring vehicles 106, 108, 110, and 112 to distinguish among their respective typical driving patterns, the autonomous driving system 200 can generate more refined and precise predictions of on-road events, and more intelligently and adeptly make and execute driving decisions. In contrast, a system that treated the neighboring vehicles 106, 108, 110, and 112 in like fashion based solely on their location, speed, and directional heading would make less refined and individualized predictions, resulting in less intelligent driving decisions.

As a result, the autonomous driving system 200 provides improved safety and efficiency. With respect to safety, the autonomous driving system 200 can better predict on-road events involving the neighboring vehicles 106, 108, 110, and 112 and adapt its driving profile to avoid circumstances that give rise to higher likelihoods of an accident. With respect to efficiency, the autonomous driving system 200 can adapt its driving profile to be defensive only when necessary, such as when it determines that neighboring vehicles may drive aggressively. If the autonomous driving system 200 did not account for physical characteristics, then it may simply drive defensively all the time, as it may assume that all neighboring vehicles may exhibit aggressive driving out of an abundance of caution.

The exemplary autonomous driving system 200 will be described in more detail in connection with FIG. 2. In particular, FIG. 2 shows a side view of the autonomous vehicle 102 and a diagrammatic view of the autonomous driving system 200 in accordance with the present disclosure. As shown, the autonomous driving system 200 includes a front camera 202 and a rear camera 204 disposed on a roof of the autonomous vehicle 102. The front camera 202 includes a lens (not shown) that can capture image data to the front of the autonomous vehicle 102 and the rear camera 204 includes a lens (not shown) that can capture image data to the rear of the autonomous vehicle 102.

Other embodiments may use different numbers of cameras located at different positions. For example, the autonomous driving system 200 may include a single 360 degree camera, or may include additional cameras mounted elsewhere on the autonomous vehicle 102, such as within the cabin of the autonomous vehicle 102, front and rear trunks of the autonomous vehicle 102, on sides of the autonomous vehicle 102, or in any other location suitable for capturing image data of the proximity of the autonomous vehicle 102.

In illustrative embodiments, the front camera 202 and the rear camera 204 have resolutions sufficient to identify physical characteristics of interest. As will be explained, illustrative embodiments of the autonomous driving system 200 may process image data to distinguish vehicle classes, makes, models, and/or trims. Distinguishing characteristics among these classes, makes, models, and/or trims should be resolvable at any distance at which the autonomous driving system 200 would factor a neighboring vehicle into its driving decisions. For example, in certain implementations, vehicles located more than 50 yards may not be factored into driving decisions, whereas vehicles located within 50 yards may be considered. Thus, in such an example, the front camera 202 and the rear camera 204 should have sufficient resolution to resolve the distinguishing characteristics at a distance of about 50 yards. However, the resolution of the front camera 202 and the rear camera 204 can vary from one implementation to the next.

After the front camera 202 and the rear camera 204 capture image data of the neighboring vehicles 106, 108, 110, and 112, the image data may be transmitted to the image processing module 206. The image processing module 206 performs pre-processing on the image data to facilitate and improve the accuracy of subsequent image recognition and characteristics identification steps. For example, the image processing module 206 may include filters that remove noise from the captured image data, adjust contrast such that distinguishing features are enhanced, convert the image data into the frequency domain to facilitate subsequent image recognition, and the like.

Figure 3A:
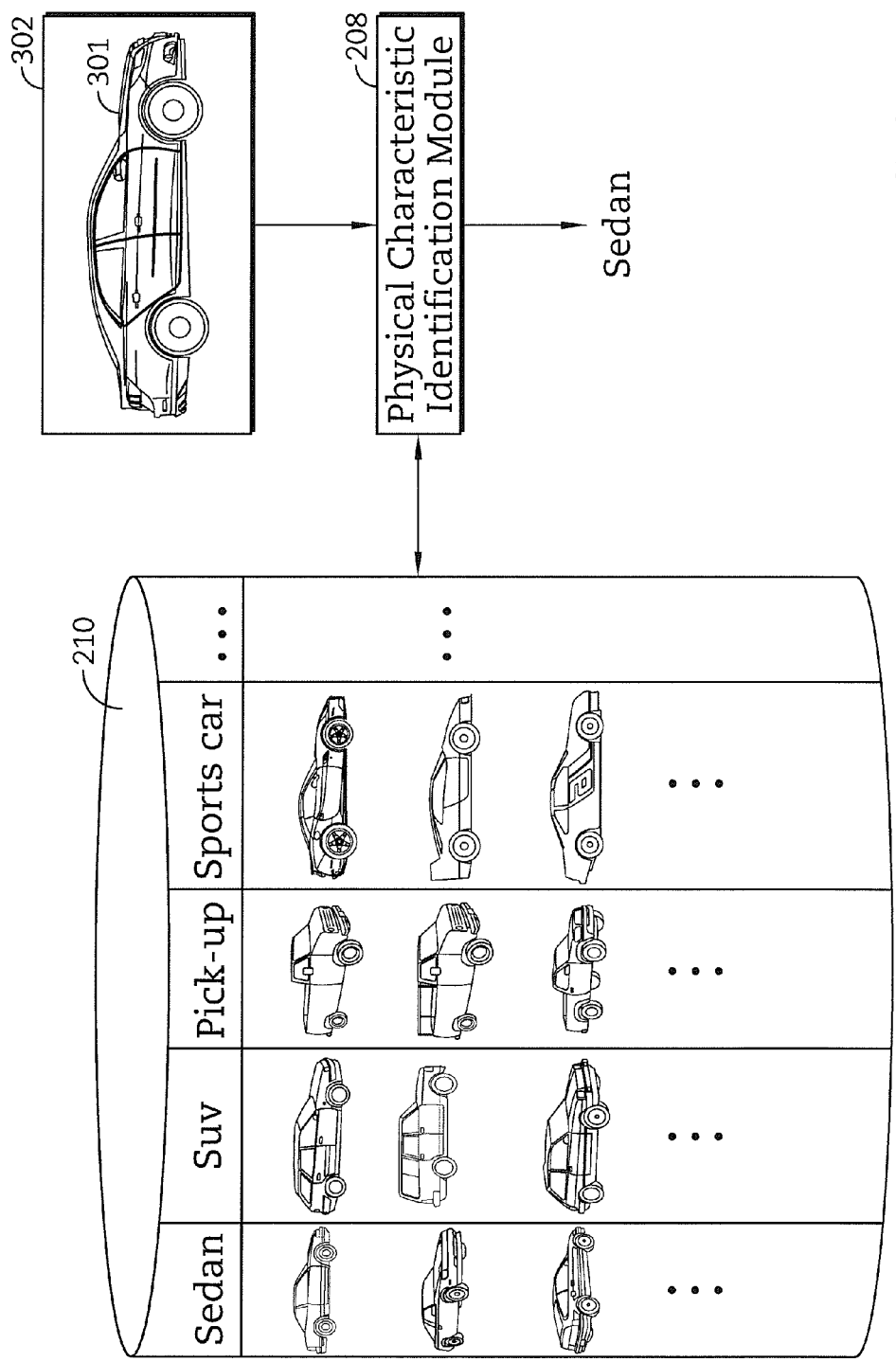

In one respect, the image processing module 206 may isolate the portions of frames of image data that contain a particular neighboring vehicle. Thus, for example, FIG. 3A shows an isolated portion of image data 302 that excludes the environment surrounding a neighboring vehicle 301, and focuses only on the neighboring vehicle 301. This allows subsequent processing to focus on data associated with the neighboring vehicle 301. To identify and isolate neighboring vehicles from image data, the image processing module 206 may use generally known statistical object recognition and classification techniques. The image processing module 206 may also apply rotation, skew, or other three-dimensional processing to account for image data of neighboring vehicles that is captured at varying angles.

After the image processing module 206 processes the image data, the processed image data may be sent to the physical characteristic identification module 208. The physical characteristic identification module 208 works in concert with a database server 210 to perform image recognition and identify physical characteristics of the neighboring vehicles 106, 108, 110, and 112.

Exemplary modes of operation of the physical characteristic identification module 208 are depicted in connection with FIGS. 3A-3C. In particular, FIG. 3A shows an exemplary mode of operation by which the physical characteristic identification module 208 recognizes the vehicle class (e.g., sedan, SUV, pick-up truck, sports car, etc.) of a vehicle 301 captured in the image data 302.

The physical characteristic identification module 208 receives the image data 302, which will have already been pre-processed by the image processing module 206. The physical characteristic identification module 208 may then apply image recognition techniques to determine the vehicle class to which the vehicle 301 belongs. The database server 210 may include sample image data and vehicle class information for numerous vehicles belonging to various vehicle classes. As depicted in FIG. 3A, the database server 210 includes sample image data and vehicle class information for sedans, SUVs, pick-ups, and sports cars, although other vehicle classes may be included as well. The physical characteristic identification module 208 queries the database server 210 with the image data 302. The database server 210 applies a classification algorithm that generally compares characteristics of the image data 302 against characteristics of the sample image data stored in the database server 210 to determine the most likely vehicle class of the vehicle 301. Suitable classifiers are generally known and, in certain implementations, may include statistical classification schemes such as neural networks.

The output of the physical characteristic identification module 208 may be a physical characteristic of the vehicle 301. In this example, the physical characteristic may be that the vehicle 301 is a sedan.

The approach depicted in FIG. 3A can also be used to identify vehicle makes, models, and trims. Whereas the depicted database server 210 includes information to classify image data into a particular vehicle class, it could also include information to classify image data into particular vehicle makes, models, or trims. For example, the database server 210 may include sample image data for numerous vehicles of particular makes and models, such as TOYOTA™ CAMRY™, VOLKSWAGEN™ JETTA™, etc. Generally, vehicles of different makes and models will have different shapes and features that can be used to distinguish among them. Statistical image recognition and classification schemes can be used to determine the most likely vehicle make and model for a given image data 302.

Once the database server 210 has determined a vehicle make and model of the vehicle 301, the database server 210 can attempt to discern the trim level of the vehicle 301. Certain trim levels have distinguishing features, e.g., spoilers, racks, distinctive head or tail lights, etc. Again using statistical image recognition and classification schemes, such features can enable the database server 210 to classify vehicles of a particular make and model according to trim.

FIG. 3B shows an alternative mode of operation by which the physical characteristic identification module 208 may identify physical characteristics. In this mode, the image processing module 206 has further pre-processed image data 302 as to identify, isolate, and zoom in on image data 304 containing a distinguishing logo 306. Where the resolution of the front camera 202 and the rear camera 204 may be sufficient to capture the distinguishing logo 306, the distinguishing logo 306 may present a more reliable image sample for identifying a vehicle make.

Here again, the physical characteristic identification module 208 may query the database server 210 using the image data 304 containing the distinguishing logo 306. The database server 210 may include numerous logo types and styles for numerous vehicle makes, and may use statistical image recognition and classification techniques to classify the distinguishing logo 306 as belonging to a particular vehicle make—in the depicted example, VOLKSWAGEN™. The output of the physical characteristic identification module 208 may be a physical characteristic of the vehicle 301—in this example, its make of VOLKSWAGEN™.

FIG. 3C shows yet another alternative mode of operation by which the physical characteristic identification module 208 may identify physical characteristics. In this mode, the image processing module 206 further pre-processed image data 302 as to identify, isolate, and zoom in on a portion of image data 306 containing textual adornment 308 that adorns the vehicle 301. The image data 306 may be used to query the database server 210. The database server 210 may recognize that the image data 306 contains a textual adornment 308 and may apply text recognition techniques by classifying each letter of the textual adornment 308. Text recognition and classification techniques may be more reliable than general image recognition and classification techniques. The database server 210 returns the results of its processing—in this example, an identification that the text reads "JETTA". Thus, the output of the physical characteristic identification module 208 may be a physical feature of the vehicle 301—in this example, its model of JETTA™.

The text recognition alternative depicted in FIG. 3C may be applicable for vehicle trim as well, because vehicle trim levels are often listed on vehicles as textual adornments.

As described, the physical characteristic identification module 208 may identify physical characteristics of neighboring vehicles, such as vehicle class, make, model, and trim. In addition, the physical characteristic identification module 208 may also identify a color of the vehicle. Vehicle color can be determined, in certain implementations, by measuring color components in pre-processed pixel data generated by the image processing module 206. For example, the physical characteristic identification module 208 may use an RGB color scheme and measure red, green, and blue components of received pixel data in order to determine a color of the vehicle.

The physical characteristic identification module 208 may also identify whether a neighboring vehicle has any safety hazards, such as exposed cargo. This identification could be made based in image recognition and classification techniques as well. In one implementation, the physical characteristic identification module 208 may identify a portion of image data 302 as corresponding to a classifiable vehicle, and also detect unclassifiable, anomalous data. The unclassifiable, anomalous data may, in actuality, correspond to, e.g., cargo strapped to a roof of a vehicle, cargo jutting out from a trunk of a vehicle, or loose cargo exposed in a trunk of a pick-up truck. The physical characteristic identification module 208 may conclude that the vehicle is carrying exposed cargo upon identification of anomalous, unclassifiable image data.

Returning to FIG. 2, the features identified by the physical characteristic identification module 208 are transmitted to the typical pattern acquisition module 212. The typical pattern acquisition module 212 correlates the identified physical characteristics with typical driving patterns for vehicles having those physical characteristics. Information on the typical driving patterns may be stored in a database 214. The database 214 may include tables, rows, and columns corresponding to vehicle classes, makes, models, trims, and any other physical characteristic within the scope of the present disclosure. Fields of the database 214 may include the typical driving patterns of vehicles having those physical characteristics.

Types of typical driving patterns may include: typical speed, typical acceleration, typical deceleration, typical lane change pattern, typical turn pattern, typical buffer distance maintained with respect to neighboring vehicles, and typical response to neighboring vehicle interactions. Each of these driving patterns may be further refined based on type of roadway e.g., typical driving patterns for highway driving, for residential driving, for rural driving, etc. Each of these driving characteristics may also be further refined based on road conditions—e.g., congested roadway, moderate congestion, open roadway, etc.

As an example of the typical speed pattern, the database 214 may include information that a particular vehicle has a typical speed of 70 M.P.H. on an open highway, and a typical speed of 30 M.P.H. on a moderately congested residential road. As an example of the typical acceleration and typical deceleration patterns, the database 214 may include information that particular vehicles typically accelerate and decelerate slowly, whereas other vehicles accelerate and decelerate rapidly. Typical lane change pattern may indicate how often particular vehicles change lanes under various roadway conditions, circumstances during which the vehicles change lanes, how likely particular vehicles are to use a turn signal, and the like. Typical turn pattern may indicate the likelihood that a vehicle will execute a turn under various roadway conditions—e.g., amount of gap between cars in oncoming traffic before a particular vehicle will attempt to execute a turn. Typical buffer distance may indicate a typical following distance that particular vehicles maintain relative to neighboring vehicles. Typical response to neighboring vehicle interactions may indicate how aggressively or defensively neighboring vehicles respond to other neighboring vehicles. For example, this type of pattern may capture that certain vehicles are more likely to grant a merging vehicle space during a lane change, whereas other vehicles may be more likely to block out a merging vehicle.

Figure 4:
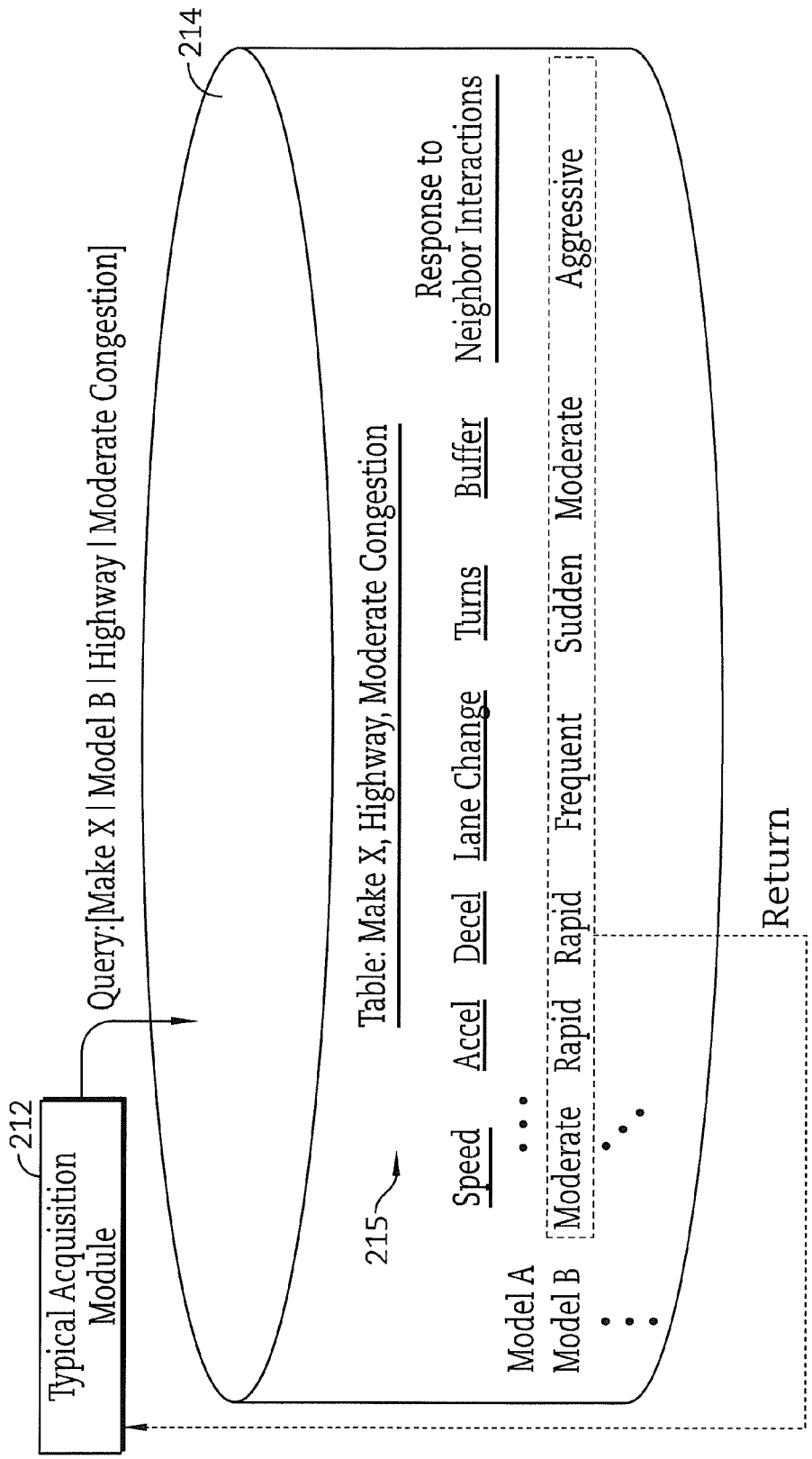
FIG. 4 shows an exemplary excerpt of a database table in accordance with the present disclosure that stores typical driving patterns for vehicles having certain physical characteristics.

The information on typical driving patterns can be stored in the database 214. FIG. 4 shows an illustrative excerpt of an exemplary database 214. Data can be organized in database 214 in any number of ways, but generally should allow the typical pattern acquisition module 212 to submit a query based on particular physical characteristics and, optionally, provide other inputs such as type of roadway (e.g., highway driving, residential driving, rural driving, etc.) and driving environment (e.g., congested, moderately congested, open, etc.). The database 214 may service the query by retrieving records from relevant database fields and returning typical driving patterns.

In the example of FIG. 4, the database 214 may be queried with a particular make ("Make X") and model ("Model B") of a vehicle, as well as certain environmental conditions, such as that the autonomous vehicle 102 is on a highway with moderate congestion. The database 214 may include many database tables, of which one database table 215 corresponds to vehicles having Make X on highways with moderate congestion. A row in the database table 215 contains the typical driving patterns for Model B. These typical driving patterns are returned in response to the query.

The information stored in the database 214 may be collected in a variety of ways. In one example, the information stored in the database 214 reflects statistics collected about observed driving patterns of vehicles having various physical characteristics. In another example, the information stored in the database 214 may be manually entered based on assumptions and understandings of how different vehicles typically behave. The information stored in the database 214 can be refined over time as additional information and statistics are collected.

In illustrative embodiments, the typical driving pattern for a given neighboring vehicle may be impacted by other neighboring vehicles. For example, one neighboring vehicle may be a rare sports car or antique roadster. Such a vehicle may distract other vehicles on the roadway, impacting their expected typical driving patterns. The typical pattern acquisition module 212 may adjust its output based on such scenarios. For example, if one of the neighboring vehicles is a potential distraction to other drivers, the typical pattern acquisition module 212 may output that other neighboring vehicles are more likely to suddenly decelerate, suddenly change lanes, etc.

Returning to FIG. 2, information regarding the typical driving patterns may be then transmitted to the prediction module 216. The prediction module 216 predicts on-road events by applying the typical driving patterns to present conditions on the roadway 104. For example, the prediction module 216 may predict that a particular neighboring vehicle may speed up, slow down, execute a lane change into a particular lane, execute a turn, increase or decrease its following distance from other neighboring vehicles, and the like.

In another respect, the prediction module 216 may predict on-road events conditional on actions that the autonomous driving system 200 may be considering. For example, the prediction module 216 may predict on-road events of neighboring vehicles in the event that the autonomous vehicle 102 executes a lane change, changes speed, or the like. This allows the autonomous driving system 200 to predict outcomes associated with potential driving decisions and select the driving decision likely to have a safe and efficient outcome.

Examples of predicted on-road events may include that: a neighboring vehicle will speed up or slow down; a neighboring vehicle will suddenly accelerate or decelerate; a neighboring vehicle will execute a lane change into a particular lane; a neighboring vehicle will execute a turn; a neighboring vehicle will modify its buffer distance with respect to other neighboring vehicles; and the like.

The predicted on-road events are then transmitted to the autonomous vehicle controller 220, which makes driving decisions based on the predicted on-road events. The autonomous vehicle controller 220 may make driving decisions based on various criteria, such as to minimize likelihood of an accident, to minimize travel time, or others. In certain embodiments, the autonomous vehicle controller 220 will execute driving decisions by balancing these interests.

Figure 5:
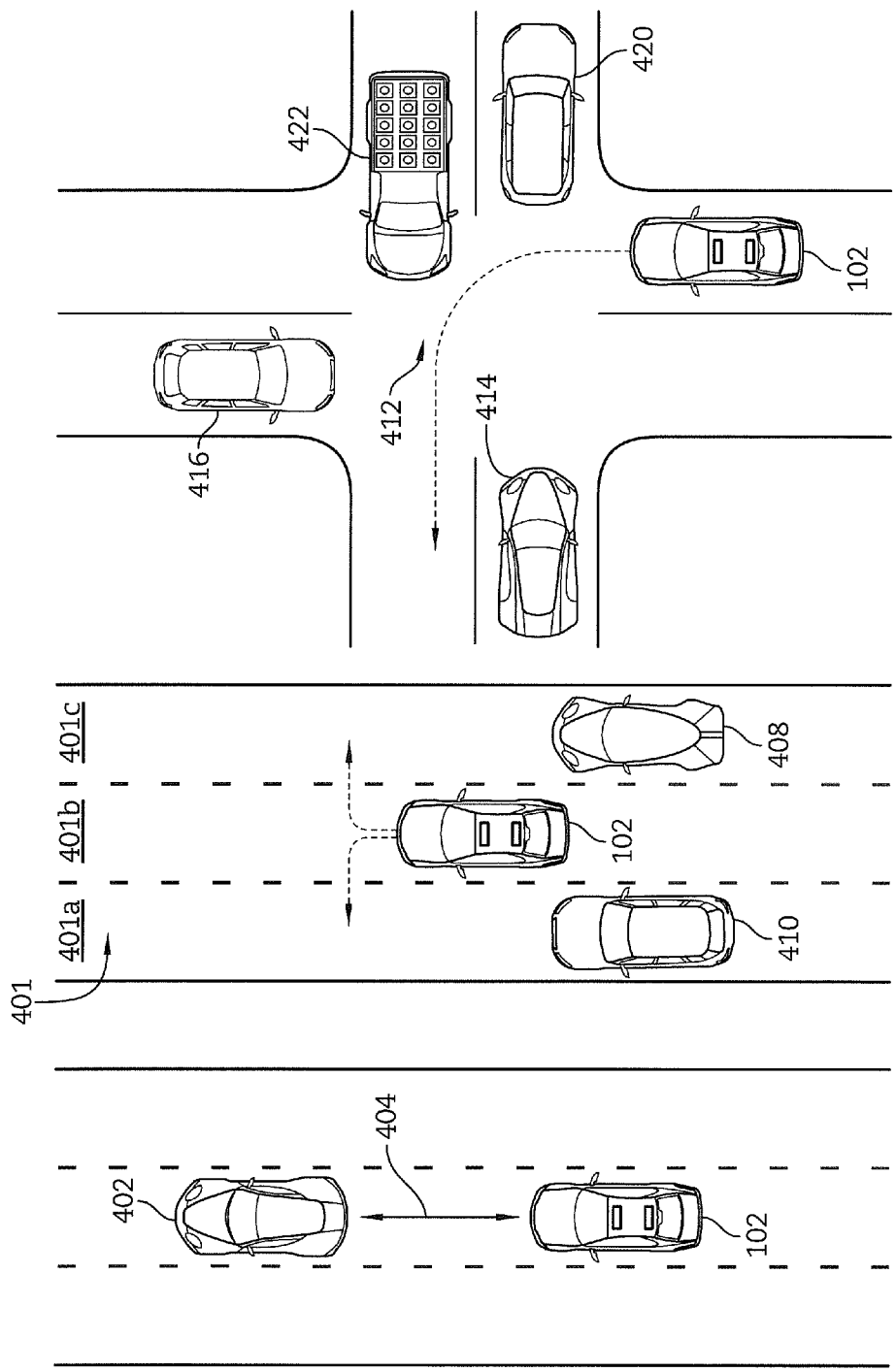
FIGS. 5A-5C show exemplary types of driving decisions that an autonomous driving system may make in accordance with the present disclosure.

FIGS. 5A-5C show exemplary types of driving decisions that the autonomous vehicle controller 220 may execute based on predictions of on-road events. FIG. 5A shows the autonomous vehicle 102 following a neighboring vehicle 402, and suggests that the autonomous vehicle controller 220 may be determining what amount of following distance 404 to maintain relative to the neighboring vehicle 402. In one example, the prediction module 216 may have predicted that the neighboring vehicle 402 may drive aggressively, with sudden acceleration and decelaration. Here, the autonomous vehicle controller 220 may elect to increase the following distance 404, to reduce the likelihood of an accident. In another example, the prediction module 216 may have predicted that the neighboring vehicle 402 will not engage in sudden acceleration and decelaration. Here, the autonomous vehicle controller 220 may elect to speed up the autonomous vehicle 102, decreasing the following distance 404 and providing enhanced speed and efficiency.

FIG. 5B shows the autonomous vehicle 102 on a roadway 401 in a middle lane 401b, and suggests that the autonomous vehicle controller 220 may be determining whether to switch to the left lane 401a or the right lane 401c. In this example, physical characteristics of a neighboring vehicle 408 include that it may be a sports car. The prediction module 216 has predicted that the neighboring vehicle 408 may engage in sudden acceleration. Physical characteristics of a neighboring vehicle 410 include that it may be a sedan. The prediction module 216 has predicted that the neighboring vehicle 410 may be likely to maintain a constant speed. Based on these predicted on-road events, the autonomous vehicle controller 220 may decide to execute a lane change into the left lane 401a, merging in front of the neighboring vehicle 410, which may be a sedan likely to maintain a constant speed. This may be a safer alternative than executing a lane change into the right lane 401b, which would involve merging in front of the neighboring vehicle 408, which may be a sports car that may suddenly accelerate.

FIG. 5C shows the autonomous vehicle 102 at an intersection 412, and suggests that the autonomous vehicle controller 220 may be determining when to execute a left turn. Here, the physical characteristics of the neighboring vehicle 418 include that it may be a pick-up truck with exposed cargo 422. The prediction module 216 may predict that the exposed cargo 422 has the potential of falling out of the neighboring vehicle 418. Based on this predicted on-road event, the autonomous vehicle controller 220 may decide to wait until the neighboring vehicle 418 has cleared the intersection 412 and traveled a safe distance away before executing the turn.

As another example, the neighboring vehicle 414 may be a rare sports car. The prediction module 216 may predict that other neighboring vehicles 416, 418, and 420 may be distracted by the rare sports car 414. In response, the autonomous vehicle controller 220 may adapt a defensive driving profile, such as to wait until the rare sports car 414 clears the intersection 412 before executing the turn.

The types of driving decisions depicted in FIGS. 5A-C are illustrative only, and generally, any type of driving decision that may be encountered by the autonomous vehicle 102 may be within the scope of the present disclosure.

The autonomous vehicle controller 220 may transmit signals corresponding to its driving decisions to vehicle controls 222, which execute driving decisions. Driving decisions may include to turn the vehicle, accelerate, or decelerate. In illustrative embodiments, the autonomous vehicle 102 includes a drive by wire system, including acceleration by wire, brake by wire, and steer by wire. Thus, the vehicle controls 222 will generate electrical signals that connect to electrical acceleration, braking, and steering modules of the autonomous vehicle 102 to execute driving decisions.

Figure 6:
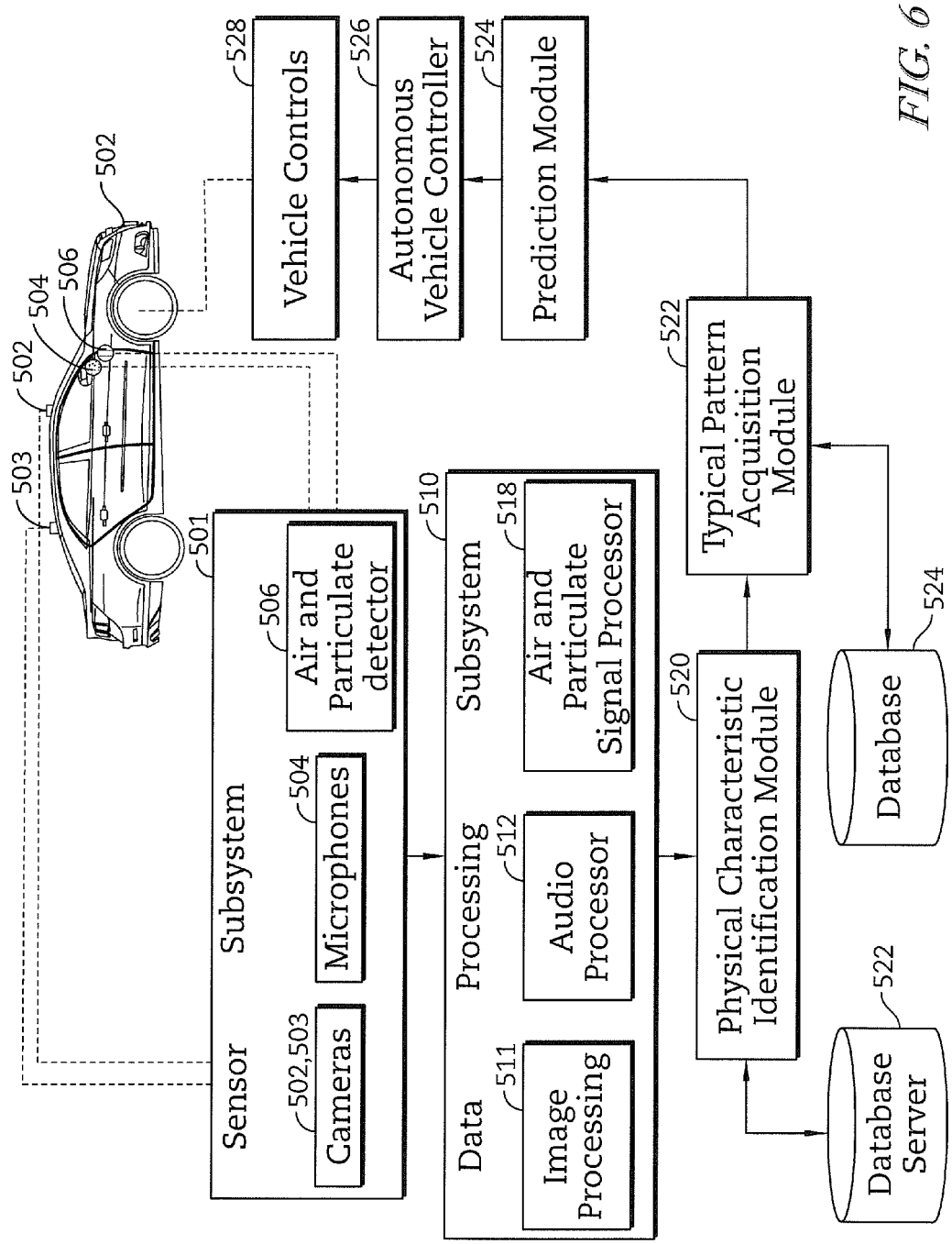
FIG. 6 shows a side view of an alternative embodiment of an autonomous vehicle and a diagrammatic view of an alternative embodiment of the autonomous driving system that includes additional sensors in addition to cameras, including microphones and an air and particulate detector.

In illustrative embodiments, the autonomous driving system may make driving decisions based on other physical characteristics, including sounds or odors emanating from neighboring vehicles. FIG. 6 shows a side view of an alternative embodiment of an autonomous vehicle 502 and a diagrammatic view of an alternative embodiment of an autonomous driving system 500 that includes additional sensors. In particular, the autonomous vehicle 502 includes a front camera 502 and a rear camera 503 that are similar to the front camera 202 and the rear camera 204 described in connection with FIG. 2. The autonomous vehicle 502 also includes a microphone 504 and an air and particulate detector 506. These sensors are used to identify additional physical characteristics of neighboring vehicles, and are provided as part of a sensor subsystem 501.

The microphone 504 may be is used to detect audio emitted from particular neighboring vehicles. Typical driving patterns of neighboring vehicles may be informed by audio. For example, if a neighboring vehicle may be emitting sounds suggesting engine trouble, the autonomous driving system 500 may determine that the neighboring vehicle could suddenly decelerate or pull over. If a neighboring vehicle may be emitting sounds suggesting loud music, the autonomous driving system 500 may determine that a driver of the vehicle may be distracted and that the neighboring vehicle may drive erratically.

The air and particulate detector 506 may be used to measure air composition through, for example, olfactory analysis, akin to how a human may smell odors in the air representing impurities. If it may be determined that a particular neighboring vehicle may be emitting excessive exhaust, the autonomous driving system 500 may avoid that neighboring vehicle. The air and particulate detector 506 may be of any type suitable for performing chemical or olfactory analysis to detect impurities typically present in air on roadways.

The autonomous driving system 500 includes a data processing subsystem 510 that pre-processes signals generated by the sensor subsystem 501. For example, the data processing subsystem 510 may apply filters to signals transmitted by the sensor subsystem 501 to remove noise and isolate meaningful data using signal processing techniques. The data processing subsystem 510 includes an image processing module 511 similar to the image processing module 206 shown in FIG. 2. The data processing subsystem 510 also includes an audio processor 512 and an air and particulate signal processor 518.

In certain implementations, the audio processor 512 may isolate and extract audio coming from particular neighboring vehicles, similar to how the image processing module 206 isolated image data associated with particular neighboring vehicles. The audio processor 512 may do this by implementing audio beamforming algorithms to isolate particular sound sources and obtain directional information on where the sound sources are coming from, as to determine which neighboring vehicle may be emitting particular sounds.

Signals from the data processing subsystem 510 are transmitted to the physical characteristic identification module 520, which may be similar to the physical characteristic identification module 208, but can recognize and identify physical characteristics based on the additional sensors shown in FIG. 6. Thus, the physical characteristic identification module 520 may obtain pre-processed audio data from the audio signal processor 512 and determine whether neighboring vehicles are emitting audio. For any isolated audio, the physical characteristic identification module 520 may consult the database 522 and use generally know statistical audio recognition and classification techniques to determine what the audio represents—e.g., music, mechanical problems, etc. Similarly, the physical characteristic identification module 520 may determine physical characteristics based on air composition, such as excessive exhaust.

Figure 2:
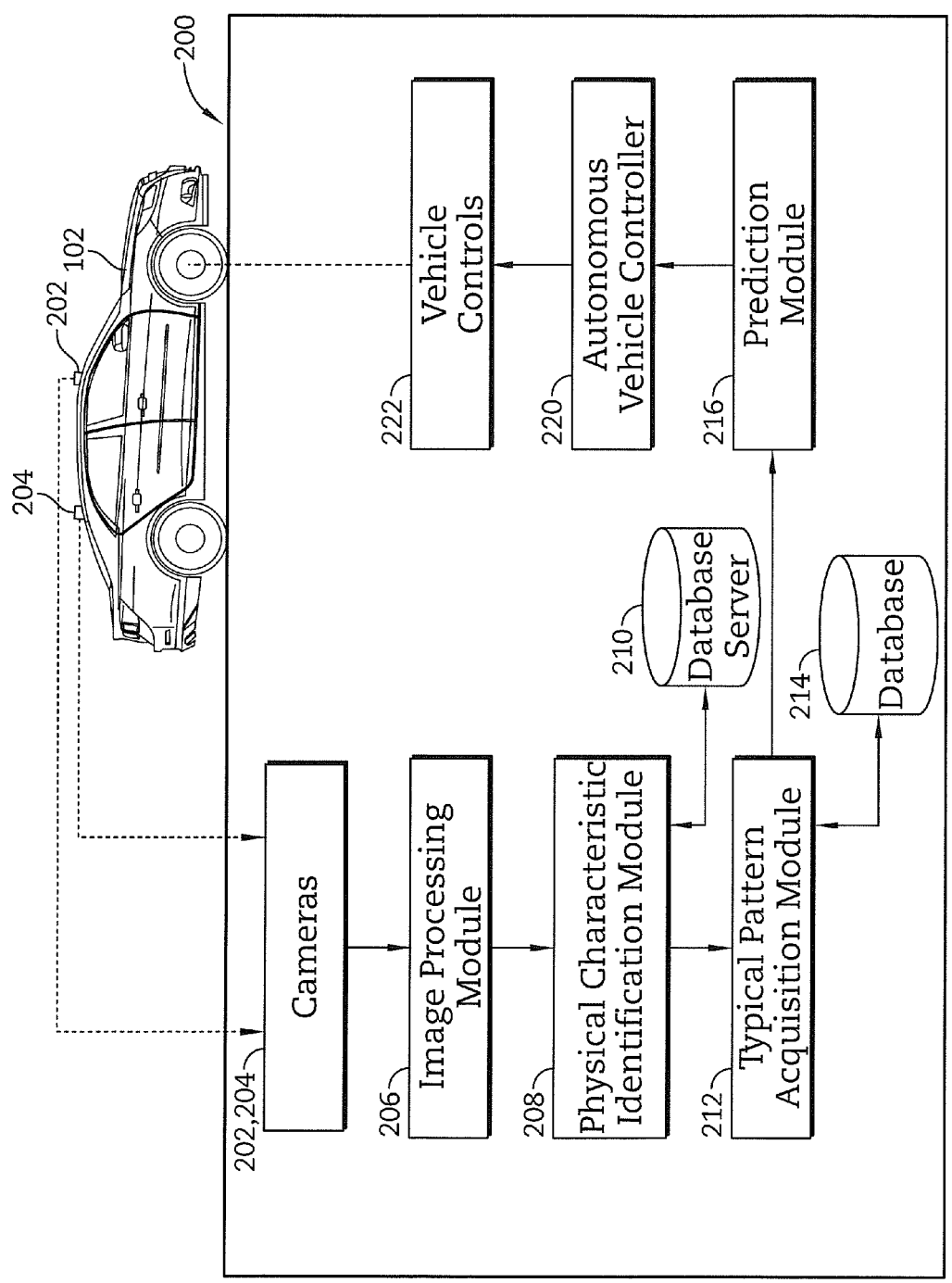
FIG. 2 shows a side view of an autonomous vehicle and a diagrammatic view of an autonomous driving system in accordance with the present disclosure, and shows that the autonomous driving system includes cameras configured to obtain image data, an image processing module configured to process the image data, a physical characteristic identification module configured to identify physical characteristics of neighboring vehicles, a typical pattern acquisition module configured to determine typical patterns of vehicles having particular physical characteristics, a prediction module configured to predict on-road events based on the determined typical patterns, an autonomous vehicle controller configured to make driving decisions, and vehicle controls configured to drive the autonomous vehicle.

The features identified by the physical characteristic identification module 520 are transmitted to the typical pattern acquisition module 522, which operates in concert with the database 524 in similar fashion as the typical pattern acquisition module 212 and the database 214 depicted above in connection with FIG. 2. However, the typical pattern acquisition module 522 refines its identification of typical driving patterns based on physical characteristics obtained from the additional sensors depicted in FIG. 6.

For example, with respect to audio data, the typical pattern acquisition module 522 may determine that vehicles having engine trouble may experience sudden deceleration, merge into a right-most lane of a roadway, or pull over to a shoulder. The typical pattern acquisition module 522 may determine that vehicles emitting loud music may drive with sudden lane changes, sudden turns, and rapid accelerations or decelerations, due to a distracted driver.

The information on typical driving patterns are sent to the prediction module 524, which predicts on-road events in similar fashion as the prediction module 216 described above in connection with FIG. 2. However, the prediction module 524 may be able to provide more refined and accurate predictions based on the additional data made available from the additional sensors depicted in FIG. 6.

The prediction module 524 transmits predicted on-road events to the autonomous vehicle controller 526. The autonomous vehicle controller 526 makes driving decisions based on the predicted on-road events in similar fashion as the autonomous vehicle controller 220 described above in connection with FIG. 2. Finally, the autonomous vehicle controller 526 transmits signals corresponding to its driving decisions to vehicle controls 528, which execute driving decisions. The vehicle controls 528 operate in like fashion as the vehicle controls 222 described above in connection with FIG. 2.

Other types of physical characteristics and corresponding predicted on-road events are within the scope of the present disclosure. In certain implementations, the autonomous vehicle may include weather sensors, such as an anemometer for measuring windspeed or moister sensors for measuring precipitation. Under windy conditions, the autonomous driving system may determine that tall panel trucks pose a safety hazard and make driving decisions to avoid such trucks. Likewise, under rainy, snowy, or icy conditions, the autonomous driving system may assess the ability of different vehicle makes and models to handle such conditions, and predict on-road events based on the how different vehicles are expected to handle—e.g., the likelihood that certain vehicles will skid, slip, be unable to quickly accelerate, etc.

Figure 7:
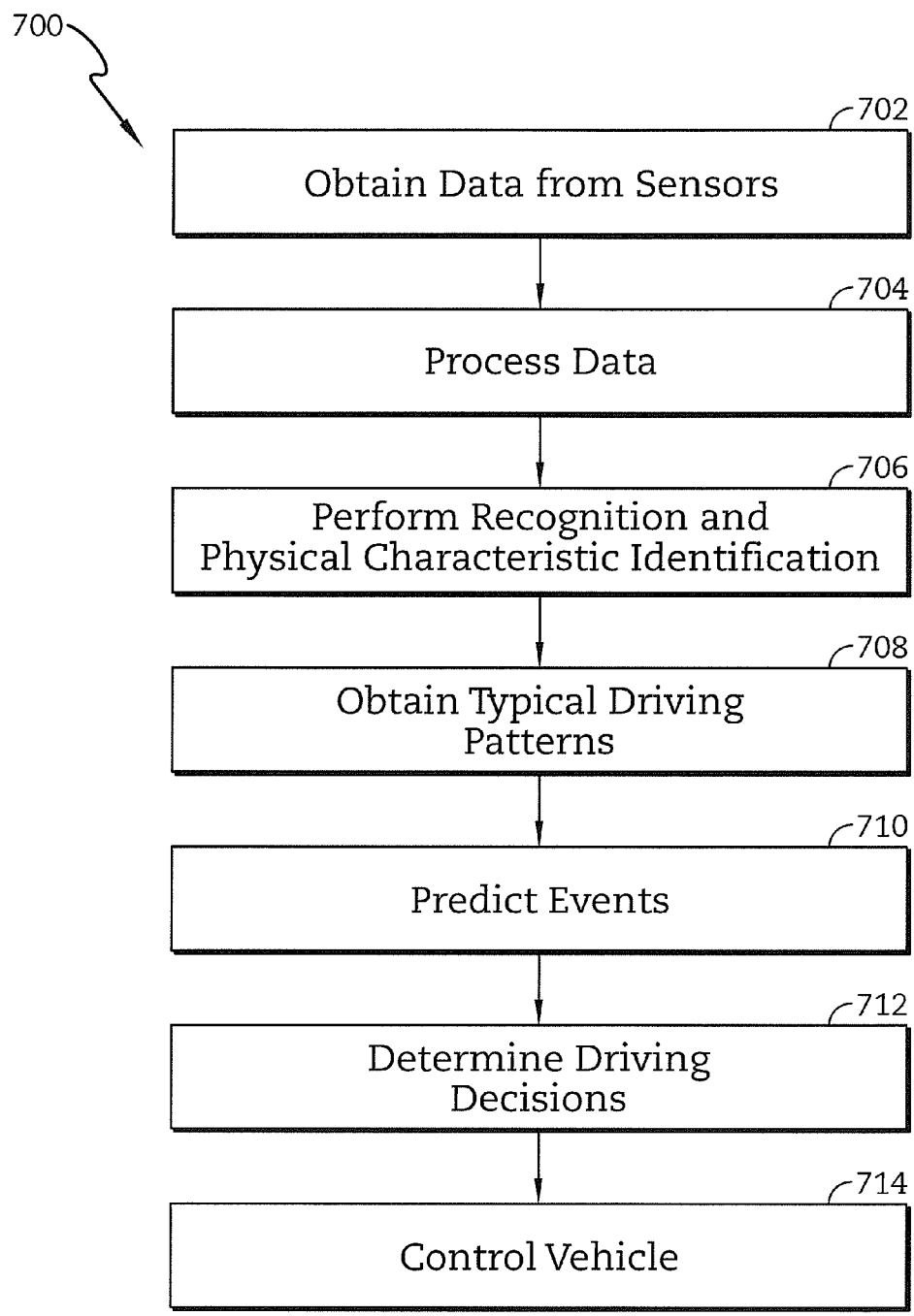
FIG. 7 shows a flow diagram illustrating an exemplary method by which the autonomous driving system controls a vehicle in accordance with the present disclosure.

FIG. 7 shows a flow diagram illustrating an exemplary method 700 by which an autonomous driving system controls a vehicle in accordance with the present disclosure. In operation 702, the autonomous driving system obtains data from sensors, such as cameras, microphones, and air composition sensors. In operation 704, the autonomous driving system processes the data as to improve data quality, filter away noise and irrelevant data, isolate data specific to particular neighboring vehicles, and otherwise prepare the data for subsequent processing. In operation 706, the autonomous driving system performs recognition and physical characteristic identification on the processed data. In this operation, the autonomous driving system may recognize neighboring vehicles as belonging to certain vehicle classes, as having certain makes, models, or trims, as having certain colors, as emitting certain types of sound or odors, as presenting safety hazards, and the like.

In operation 708, the autonomous driving system obtains typical driving patterns for neighboring vehicles based on the identified characteristics. In operation 710, the autonomous driving system predicts on-road events based on the typical driving patterns. In operation 712, the autonomous driving system determines driving decisions. Finally, in operation 714, the autonomous driving system controls the vehicle as to execute the driving decisions.

The functionality of each of the modules described above, including the image processing module 206, the physical characteristic identification module 208, the typical pattern acquisition module 212, the prediction module 216, and the autonomous vehicle controller 220, may be implemented in software programmed in any suitable programming language. The same may apply for corresponding modules shown in FIG. 6. In exemplary implementations, the software may be implemented in programming languages such as C or assembly, which provide the benefit of fast execution time beneficial for a system that make real time driving decisions. C and assembly also are conducive for compilation to and execution on microcontrollers, making the software suitable for use in embedded systems, which may be beneficial for in-vehicle systems that make real time driving decisions.

The above-described software may be compiled and stored to a memory as object code, and during operation of the vehicle, may be invoked for execution by a processor. The above-described modules, memory, and processor may be provided on a single chip package, such that the autonomous driving system 200 may be provided as a single system on a chip. Alternatively, the above-described modules may be provided in separate chip packages that communicate with one another using busses or other suitable communications mechanisms.

When implemented as a single system on a chip, the chip may be provided in any convenient location in the autonomous vehicle 102, such as behind a dashboard near other electronic circuitry. Such a location may be beneficial for providing convenient access for the system on a chip to a power source, and to the electronic systems controlling the vehicle's driving.

The database server 210 and the database 214 may be provided locally onboard a memory stored in the autonomous vehicle 102, or may be stored on a separate server. By storing the database server 210 and the database 214 on a separate server, they may more readily be centrally managed and updated. In such a circumstance, the autonomous vehicle 102 may include a wireless communication mechanism, such cellular network connectivity, wide area networking wireless capabilities, or local wireless networking capability (e.g., "WiFi"). The database server 210 and the database 214 may be implemented using any known database environment, such as Oracle, DB2, or SQL Server.

Although certain embodiments have been described and illustrated in exemplary forms with a certain degree of particularity, it is noted that the description and illustrations have been made by way of example only. Numerous changes in the details of construction, combination, and arrangement of parts and operations may be made. Accordingly, such changes are intended to be included within the scope of the disclosure, the protected scope of which is defined by the claims.

The invention claimed is:

1. A system for controlling an autonomous vehicle, comprising: one or more cameras for obtaining image data of neighboring vehicles in a proximity of the autonomous vehicle; a processor and a non-transitory data storage on which is stored computer code which, when executed on the processor, causes the autonomous driving system to identify, based on comparing the obtained image data with stored sample image data for a plurality of vehicles of particular makes and models, physical characteristics of the neighboring vehicles, wherein the physical characteristics include: classes, makes, models, and trims of the neighboring vehicles; colors of the neighboring vehicles; and exposed cargo being carried by the neighboring vehicles; means for mapping the identified physical characteristics into predicted potential on-road events in the proximity of the autonomous vehicle; means for determining driving decisions based on the predicted potential on-road events; and vehicle controls that implement the determined driving decisions, wherein the means for mapping the identified physical characteristics into predictions includes a database that: associates classes, makes, models, and trims of vehicles with respective expected driving patterns for vehicles of those makes, models, and trims; associates colors of vehicles with respective expected driving patterns for vehicles of those colors; and associates certain vehicle makes and models with aggressive driving patterns; wherein the respective expected driving patterns are further defined by road type and road condition; wherein the means for determining driving decisions includes software that adopts a defensive driving profile upon a determination that a vehicle having an aggressive driving pattern is in the proximity of the autonomous vehicle; wherein the defensive driving profile is a driving profile that accounts for neighboring vehicles that will distract other drivers and a prediction of how the other drivers will drive in response to the distraction.

2. The system of claim 1, wherein the defensive driving profile includes increasing the space between the autonomous vehicle and the vehicle having one of the aggressive driving patterns.

3. The system of claim 1, wherein the computer code causes the autonomous driving system to identify the physical characteristics of vehicles in left and right neighboring lanes; and the means for determining driving decisions includes software that selects either the left or the right neighboring lane for a lane change by assessing, based on the identified physical characteristics, which of the neighboring lanes will be safer.

4. The system of claim 1, wherein classes of the physical characteristics include at least a sports car, a sedan, a sport utility vehicle, and a truck.

5. A system for automatically driving an autonomous vehicle, comprising:
one or more sensors for obtaining data about at least one neighboring vehicle in a proximity of the autonomous vehicle;
a processor and a non-transitory data storage on which is stored computer code which, when executed on the processor, causes the autonomous driving system to:
identify, based on the obtained data, physical characteristics of the neighboring vehicle;
map the identified physical characteristics into predicted potential on-road events in the proximity of the autonomous vehicle; and
determine driving decisions based on the predicted potential on-road events; and
vehicle controls that implement the driving decisions,
wherein the computer code causes the autonomous driving system to:
predict, using the obtained data, neighboring vehicles that will distract other drivers by associating the obtained data with distraction, and
adopt a defensive driving profile in response to the identification of the vehicles that will distract other drivers,
wherein the defensive driving profile is a driving profile that accounts for neighboring vehicles that will distract other drivers and a prediction of how the other drivers will drive in response to the distraction.

6. The system of claim 5, further comprising a database that associates the physical characteristics with respective expected driving patterns for vehicles having those physical characteristics.

7. The system of claim 5, wherein the physical characteristics include a determination of a classification of the neighboring vehicle as one of at least a sports car, a sedan, a sport utility vehicle, and a truck.

8. The system of claim 7, wherein the computer code causes the autonomous driving system to:
predict that a lane containing a truck will move slowly; and
determine that the autonomous vehicle should avoid the lane containing the truck.

9. The system of claim 5, wherein the physical characteristics include at least one of a make of the neighboring vehicle and a model of the neighboring vehicle.

10. The system of claim 5, wherein the computer code causes the autonomous driving system to identify an existence of physical hazards associated with the neighboring vehicle.

11. The system of claim 10, wherein the physical hazards include exposed cargo stored on the neighboring vehicle.

12. The system of claim 10, further comprising weather sensors for determining present weather conditions, wherein the computer code causes the autonomous driving system to assess driving patterns of the neighboring vehicle given existing weather conditions.

13. The system of claim 12, wherein
the database associates certain physical characteristics with aggressive driving patterns, and
the computer code causes the autonomous driving system to increase a driving distance relative to vehicles having the physical characteristics associated with the aggressive driving patterns.

14. A method of autonomously driving an autonomous vehicle, comprising:
obtaining data regarding neighboring vehicles in a proximity of the autonomous vehicle;
identifying physical characteristics of the neighboring vehicles;
mapping the identified physical characteristics into predicted potential on-road events in the proximity of the autonomous vehicle;
determining driving decisions based on the predicted potential on-road events; and
controlling the vehicle based on the driving decisions,
identifying vehicle makes and vehicle models for the neighboring vehicles; and
mapping the identified vehicle makes into predictions of expected driving behaviors for the neighboring vehicles and vehicle models into predictions of expected driving behaviors for the neighboring vehicles;
determining present weather conditions; and
identifying neighboring vehicles that are not suited for present weather conditions;
wherein one or more vehicles are identified as not suited in response to a determination of a likelihood that the vehicles will slip, skid, or be unable to accelerate in the determined present weather conditions.

15. The method of claim 14, comprising:
classifying neighboring vehicles as one of at least a sports car, a sedan, a sport utility vehicle, and a truck; and
mapping the classifications into predictions of expected driving behaviors for the neighboring vehicles.

16. The method of claim 15, comprising determining lane change timing and location based on vehicle makes or vehicle models of vehicles occupying neighboring lanes.

17. The method of claim 14, comprising
identifying hazards associated with the neighboring vehicles; and
determining driving decisions that increase a driving distance relative to the hazards.

18. The method of claim 17, comprising identifying exposed cargo on the neighboring vehicle.

* * * * *